Patented May 16, 1939

2,158,411

UNITED STATES PATENT OFFICE 2,158,411

METHOD FOR RESTRAINING OR PREVENTING THE ACTION OF PROTEOLYTIC ENZYMES

Leonard Elion, Scheveningen, Netherlands

No Drawing. Application May 24, 1938, Serial No. 209,808. In the Netherlands June 11, 1937

10 Claims. (Cl. 99—150)

My invention relates to the treatment of protein containing vegetable or animal products, which are liable to proteolytic conversions by the action of proteinases, such as papain, bromelin, cathepsin, etc.

It is known that certain substances are able to restrain the action of protein decomposing enzymes of the papain type. This is the case with some oxidizing agents, such as persulfates, bromates and iodates. However, not all oxidizing agents have the same action in this respect. This appears for instance, from investigations by Jørgensen (Biochem. Zeitschrift 280, 1, 1935), who ascertained a negative action of an oxidizing agent as potassium chlorate. On the other hand, he found a strong reducing agent having a retarding effect on the proteolysis in ascorbic acid.

I have found that the action of proteolytic enzymes can be retarded or prevented by addition of iodine halogenide, even in very small quantity. Examples of iodine halogenides are iodine chloride or iodine bromide, but I use preferably iodine trichloride.

The method of my invention may be applied to all protein containing products of vegetable or animal origin, which in the presence of enzymes can undergo proteolytic conversions, which it is desired to restrict or to prevent. Such conditions may for instance be present in the production of flour or other ground cereals, the preparation of bread and baking agents, the production of cattle fodder, the gelatine industry, etc. The invention may also be applied to products containing proteinase, also in case same do not contain proteins.

The following illustrations give an idea of some of the applications of the invention intended here.

In the preparation of bread it occurs, that the proteinases of the flour too strongly decompose the gluten with the result that the loaf volume is unfavorably influenced. According to my invention it is possible to prevent this unfavorable action. It is even possible, when using flour, which itself gives a nice loaf of large volume, to obtain by means of my method a considerable increase of volume. An example of this latter case was for instance obtained in three baking tests with Manitoba-flour, which differed in that in the second test 30 mg. of potassium bromate and in the third 10 mg. of iodine trichloride were added to 1 kg. of flour, no baking agent being added in the first test. The average loaf volume obtained from doughs of 450 g. in the first test was 2016 cm.$^3$, in the second 2197 cm.$^3$ and in the third test 2251 cm.$^3$. Notwithstanding the fact that the increase of the loaf volume by the use of iodine trichloride was, therefore, appreciably larger than with the triple amount of potassium bromate, the structure of the loaf containing iodine trichloride was much better than in the case of potassium bromate.

When employing in the bakery baking agents in the form of malt products containing diastase, it may happen that the proteolytic malt enzymes have such an unfavorable influence on the gluten as is mentioned above with regard to the flour proteinases. By the application of my method it is possible to eliminate this drawback, e. g. by incorporating a small quantity of iodine trichloride into the malt product. By way of example, excellent results may be obtained by the addition of 1 g. of iodine trichloride to 1 kg. of malt product.

In the preparation of gelatine it is of much importance that the gelatine containing solution, obtained by extraction of the raw material does not lose the ability to gelatinate, due to the action of proteolytic enzymes. My method makes it possible to prevent this unfavorable action of the proteinases. By a simple experiment it is possible to demonstrate this effect (vide Jørgensen l. c.). If an extract of papain is allowed to react for some time upon a gelatine solution, to which if desired a buffer is added, the result may be that the gelatine altogether loses its capacity to solidify. By addition of a small amount of iodine chloride or bromide, for example 25 mg. per 100 cm.$^3$, the papain can be entirely prevented from effecting its protein splitting action.

It is clear that the amount of iodine chloride and iodine bromide, which is used according to my invention, depends on the circumstances, viz. the nature of the products to be treated and the effect desired. I may say, however, that as appears from the above illustrations even very small amounts are sufficient to bring about a strong action.

The incorporation of the iodine halogenide according to my invention can take place in many suitable ways. For instance, the substance as such may be added, mixed with other substances, or not. It is also possible to treat the protein containing product with a solution of iodine halogenide in water or another suitable solvent, e. g. by simple mixing, spraying, etc. Furthermore, the iodine halogenide can first be adsorbed by an adsorption agent, for instance, silica gel or dried potato flour, and the obtained product taken up in the protein containing material in a suitable manner.

A suitable method is also first to incorporate the iodine halogenide in a relatively small amount of the material to be treated and thereupon to thoroughly mix this part with the rest of the material. This method works e. g. very well with flour, in which case, therefore, first a small amount of flour containing iodine halogenide is prepared which is thoroughly mixed with the main mass.

What I claim is:

1. The treatment of at least one product from the group consisting of protein containing products liable to proteolytic conversion and proteinase containing products suitable for effecting proteolytic conversion, for the purpose of restraining or preventing the action of proteolytic enzymes, comprising incorporating into such product a small quantity of iodine halogenide.

2. The treatment of at least one product from the group consisting of protein containing products liable to proteolytic conversion and proteinase containing products suitable for effecting proteolytic conversion, for the purpose of restraining or preventing the action of proteolytic enzymes, comprising incorporating into such product a small quantity of iodine trichloride.

3. The treatment of at least one product from the group consisting of protein containing products liable to proteolytic conversion and proteinase containing products suitable for effecting proteolytic conversion, for the purpose of restraining or preventing the action of proteolytic enzymes, comprising adding a solution of iodine halogenide to such product.

4. Process according to claim 3 in which an aqueous solution of iodine halogenide is added.

5. The treatment of at least one product from the group consisting of protein containing products liable to proteolytic conversion and proteinase containing products suitable for effecting proteolytic conversion, for the purpose of restraining or preventing the action of proteolytic enzymes comprising adding to such product iodine halogenide mixed with other substances.

6. The treatment of at least one product from the group consisting of protein containing products liable to proteolytic conversion and proteinase containing products suitable for effecting proteolytic conversion, for the purpose of restraining or preventing the action of proteolytic enzymes, comprising adding to such product iodine halogenide adsorbed by other substances.

7. Proteins liable to enzymatic proteolysis in which a small quantity of iodine halogenide is incorporated.

8. Proteins liable to enzymatic proteolysis in which a small quantity of iodine trichloride is incorporated.

9. Products containing proteinase and suitable for effecting proteolytic conversion in which a small quantity of iodine halogenide is incorporated.

10. Products containing proteinase and suitable for effecting proteolytic conversion in which a small quantity of iodine trichloride is incorporated.

LEONARD ELION.